United States Patent [19]

Satou

[11] Patent Number: 5,724,156
[45] Date of Patent: Mar. 3, 1998

[54] FACSIMILE APPARATUS AND METHOD HAVING FUNCTION OF RELAY TRANSMISSION OR RELAY RESULT REPORT TRANSMISSION

[75] Inventor: Yukinori Satou, Ebina, Japan

[73] Assignee: Ricoh Company, Ltd., Tokyo, Japan

[21] Appl. No.: 714,878

[22] Filed: Sep. 17, 1996

Related U.S. Application Data

[63] Continuation of Ser. No. 517,359, Aug. 21, 1995, abandoned, which is a continuation of Ser. No. 233,345, Apr. 26, 1994, abandoned.

[30] Foreign Application Priority Data

| Apr. 27, 1993 | [JP] | Japan | 5-099946 |
| Oct. 29, 1993 | [JP] | Japan | 5-271367 |
| Apr. 18, 1994 | [JP] | Japan | 6-078558 |

[51] Int. Cl.⁶ .................. H04N 1/00; H04M 11/00
[52] U.S. Cl. ............... 358/407; 358/440; 379/100
[58] Field of Search .................. 358/404, 405, 358/406, 407, 434, 435, 436, 438, 439, 440; 340/825.34, 825.44; 379/100

[56] References Cited

U.S. PATENT DOCUMENTS

| 4,748,662 | 5/1988 | Hirata | 379/100 |
| 5,014,300 | 5/1991 | Harvath et al. | 379/100 |
| 5,090,049 | 2/1992 | Chen | 379/100 |
| 5,175,634 | 12/1992 | Matsuzaki | 358/436 |
| 5,224,156 | 6/1993 | Fuller et al. | 358/407 |
| 5,311,579 | 5/1994 | Yoshida | 358/402 |

FOREIGN PATENT DOCUMENTS 63-104572  5/1988  Japan.

OTHER PUBLICATIONS

Patent Abstracts of Japan, JP 63-104572, Jun. 10, 1988, abstract only.

Xerox 3010 Facsimile Terminal Operator Manual, (1989) pp. 56–59, 100–106, 164, 173, 1989.

Primary Examiner—Edward L. Coles, Sr.
Assistant Examiner—Kimberly A. Williams
Attorney, Agent, or Firm—Oblon, Spivak, McClelland, Maier & Neustadt, P.C.

[57] ABSTRACT

A detecting unit detects dual-tone multifrequency data so as to obtain a receiving station number therefrom, the dual-tone multifrequency data being sent from a station requesting a relay transmission operation to be performed and the receiving station number being used to transmit information, through the relay transmission operation, to the receiving station which has the receiving station number. The detecting unit also detects dual-tone multifrequency data so as to obtain a destination station number therefrom, the dual-tone multifrequency data being sent from a station which has requested a relay transmission operation to be performed, the destination station number being used to transmit a relay result report to the destination station having the destination station number, and the relay result report concerning the relay transmission operation which has been performed in accordance with the request.

26 Claims, 7 Drawing Sheets

*.** [ ONE-TOUCH : ×× ]
      [ ABBREVIATED : *×× ]

*** [ ONE-TOUCH     : ×× ]
    [ ABBREVIATED : *×× ]

FIG. 9

| FEBRUARY 17, 1993    15:10    RICOH AOYAMA OFFICE |
| TO : RECOH TODA OFFICE |

FACSIMILE APPARATUS AND METHOD HAVING FUNCTION OF RELAY TRANSMISSION OR RELAY RESULT REPORT TRANSMISSION

This application is a Continuation of application Ser. No. 08/517,359, filed on Aug. 21, 1995, now abandoned, which is a Continuation of application Ser. No. 08/233,345, filed on Apr. 26, 1994, abandoned.

BACKGROUND OF THE INVENTION

1. Field of the Invention

The present invention relates to a facsimile apparatus and method, and facilitates acceptance of a relay transmission request even if the request comes from either a facsimile apparatus having no special relay requesting function or an apparatus manufactured by a manufacturer different from the manufacturer of the apparatus which is to accept the request.

2. Related Art

In the related art, an apparatus cannot accept any relay request transmitted either by an apparatus having no suitable relay requesting function or by an apparatus manufactured by a manufacturer different from that of the apparatus which is to accept the request. Thus, a relay multi-address transmission operation cannot be performed between apparatuses manufactured by different manufacturers. Even between apparatuses from the same manufacturer, the relay multi-address transmission operation cannot be performed unless an apparatus which requests the operation has the suitable relay requesting function.

An example of an improved facsimile technology in the related art may eliminate the above problem, which technology is disclosed in Japanese Laid-Open Patent Application No. 63-104572. The technology detects a push button dial selecting signal so as to enable either a relay multiple-address transmission request communication operation or confidential communication operation, to be performed between apparatuses manufactured by different manufacturers. However, the above publication No. 63-104572 does not disclose a feature of the present invention which will be described, a function of detecting DTMF (dual-tone multifrequency) data from a received signal, and the above technology in the related art performs a relay multiple-address transmission request communication operation or confidential communication operation in a method different from that of the present invention. (The DTMF is a known signaling method and the DTMF data comprises tones which are generated as a result of pressing a key among push-button keys provided in the form of a matrix.)

SUMMARY OF THE INVENTION

An object of the present invention is, as described above, to facilitate acceptance of a relay transmission request even if the request comes from either a facsimile apparatus having no special relay requesting function or an apparatus manufactured by a manufacturer different from the manufacturer of the apparatus which is to accept the request.

To achieve the above object of the present invention, a facsimile apparatus according to the present invention comprises detecting means for detecting dual-tone multifrequency data so as to obtain a receiving station number therefrom, said dual-tone multifrequency data being sent from a station requesting a relay transmission operation to be performed and said receiving station number being used to transmit information, through said relay transmission operation, to the receiving station which has said receiving station number.

Another facsimile apparatus according to the present invention comprises detecting means for detecting dual-tone multifrequency data so as to obtain a destination station number therefrom, said dual-tone multifrequency data being sent from a station which has requested a relay transmission operation to be performed, said destination station number being used to transmit a relay result report to the destination station having said destination station number, the relay result report being connected with said relay transmission operation which has been performed in accordance with said request. Thus, the apparatus can easily accept the destination station number so as to use the number in transmission of a relay-multi-address transmission result to the station which has requested the relay multi-address transmission.

The above apparatus preferably further comprises destination name adding means for adding the destination name, which has been obtained using said receiving station number, to said information; and transmission means for transmitting said information together with said destination name to said receiving station. The receiving station number may comprise a one-touch dialing number, abbreviated dialing number or group number and the information may comprise image information. Thus, the relay multi-address transmission operation may be performed in which the destination names of the receiving stations are respectively added to the image information. Such process simplifies the task of the operator of the relay requesting station regarding adding the destination names to the image information.

The above apparatus preferably further comprises checking means for checking whether or not the receiving station numbers are identical to those previously stored in said facsimile apparatus. By performing such a checking operation for each receiving station number, it is possible to let the relay requesting station clearly know which receiving station number is not previously stored in the requested station.

Other objects and further features of the present invention will become more apparent from the following detailed description when read in conjunction with the accompanying drawings.

DESCRIPTION OF THE PREFERRED EMBODIMENTS

Figure 1:
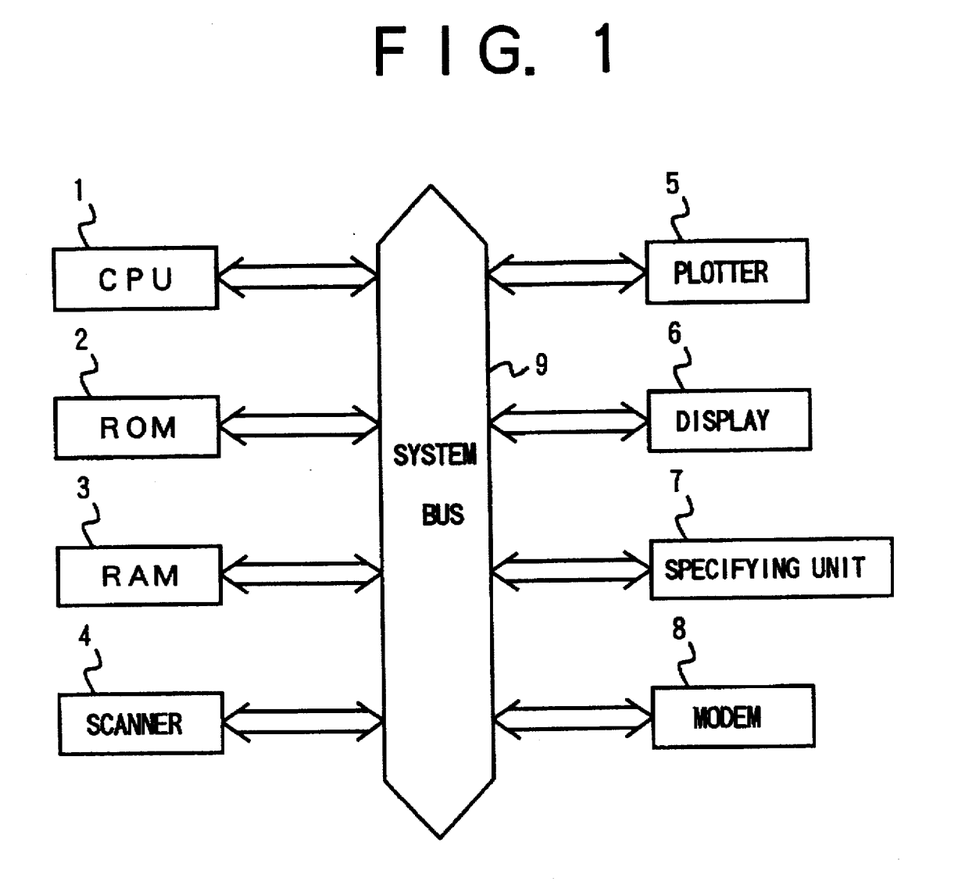
FIG. 1 shows a block diagram of a facsimile apparatus in a first embodiment of the present invention.

With reference to FIG. 1, a system construction of a facsimile apparatus of a first embodiment of the present invention is now described. The apparatus includes a CPU 1 of a microcomputer for controlling communication operations and so forth. The apparatus also includes a ROM 2 for storing various control programs which the CPU 1 executes and various types of data necessary for the CPU 1 to execute the control programs. The apparatus also includes a RAM 3 for storing image information to be transmitted. The apparatus also includes a scanner 4 for reading an original image at a predetermined resolution so as to obtain read information. The apparatus also includes a plotter 5 for printing given image data on a recording sheet at a predetermined resolution. The apparatus also includes a display 6 for displaying a telephone number or the like as appropriate. The apparatus also includes a specifying unit 7 for an operator to specify a telephone number or the like as appropriate. The apparatus also includes a modem 8 for processing data so as to transfer the data between the apparatus and a communication line. Each component above is connected to a system bus 9 and data is transferred among the components generally via the system bus 9.

Operation of the apparatus is now described with reference to FIGS. 2 and 3.

An operator of a requesting station dials a number of a relay station through a telephone handset of the facsimile apparatus. The relay station comprises a facsimile apparatus in the first embodiment of the present invention. Then, after the relay station accepts the calling by the above dialing, the relay station transmits a CED and DIS. With regard to various abbreviations such as CED, DIS, and so forth, the following table is provided:

CED: Called Station Identification;
NSF: Non-Standard Facilities;
CSI: Called Subscriber Identification;
DIS: Digital Identification Signal;
DTMF: Dual Tone Multi-Frequency
TSI: Transmitting Subscriber Identification
DCS: Digital Command Signal;
TCF: Training Check;
CFR: Confirmation to Receive;
PIX: Pixel information;
EOP: End of Procedure; and
MCF: Message Confirmation.

During the CED and DIS transmission (in a process $P_1$ in FIG. 3), the relay station checks the signal transmitted by the requesting station for a DTMF "#" delimiter. If it is found, the relay station transmits an acknowledgement tone (the 1750 Hz tone for 700 ms referred to as *1 in FIG. 3) so as to let the requesting station know that the relay station enters a service mode. Then, the relay station is in a state of awaiting the remote-control ID (identifier) to be input (in a process $P_2$ in FIG. 3). The relay station then checks whether a remote-control ID (comprising a four-digit code consisting of digits 0–9) detected in the DTMF data transmitted by the requesting station is identical to one previously stored in the relay station. If it is identical, the relay station transmits the acknowledgement tone so as to cause the requesting station to recognize that the relay station enters a state (a process $P_3$ in FIG. 3) of awaiting a service code to be input. If the relay station does not have the remote-control ID therein identical to that included in the DTMF data transmitted by the requesting station, the relay station transmits a non-acknowledgement tone (three successive 580 Hz tones of 80 ms duration and then no tone for 60 ms, referred to as *2 in FIG. 3) so as to cause the requesting station to recognize that the relay station again enters the state of awaiting the remote-control ID to be input (in the process $P_2$). If either the relay station detects a solitary DTMF tone "#" including no remote-control ID or a time period equal to 5 seconds has elapsed without receiving suitable input data, the relay station transmits the non-acknowledgement tone so as to cause the requesting station to recognize that the relay station again enters the state of awaiting the remote-control ID to be input (in the process $P_2$). If the relay station in the remote-control ID awaiting state receives no input data for 30 seconds, the relay station cuts the communication circuit (in a process $P_8$ in FIG. 3). If the requesting station successively sends five remote-control IDs and none of them match one which the relay station has therein, the relay station cuts the circuit (in the process $P_8$).

The relay station in the above state of awaiting a service code to be input (in the process $P_3$) checks whether a service code detected in the DTMF data transmitted by the requesting station is identical to one previously stored in the relay station. The term 'service code' means a predetermined code which the relay station needs to receive so as to perform the relevant relay transmission function. In this example, the service code is assumed to be "24". If the service code present in the DTMF data is identical to one which the relay station has therein, the relay station transmits the acknowledgement tone so as to cause the requesting station to recognize that the relay station enters a state (a process $P_4$ in FIG. 3) of awaiting a relay result report destination to be input. If the service code present in the received DTMF data is not identical to one which the relay station has, the relay station transmits the non-acknowledgement tone so as to cause the requesting station to recognize that the relay station again enters the state (the process $P_3$) of awaiting the service code to be input. If either the relay station detects a solitary DTMF tone "#" including no service code or a time period equal to 5 seconds has elapsed without receiving suitable input data, the relay station transmits the non-acknowledgement tone so as to cause the requesting station to recognize that the relay station again enters the state of awaiting the service code to be input (in the process $P_3$). If the relay station in the service code awaiting state receives no input data for 30 seconds, the relay station cuts the communication circuit (in a process $P_8$ in FIG. 3).

Figure 3:
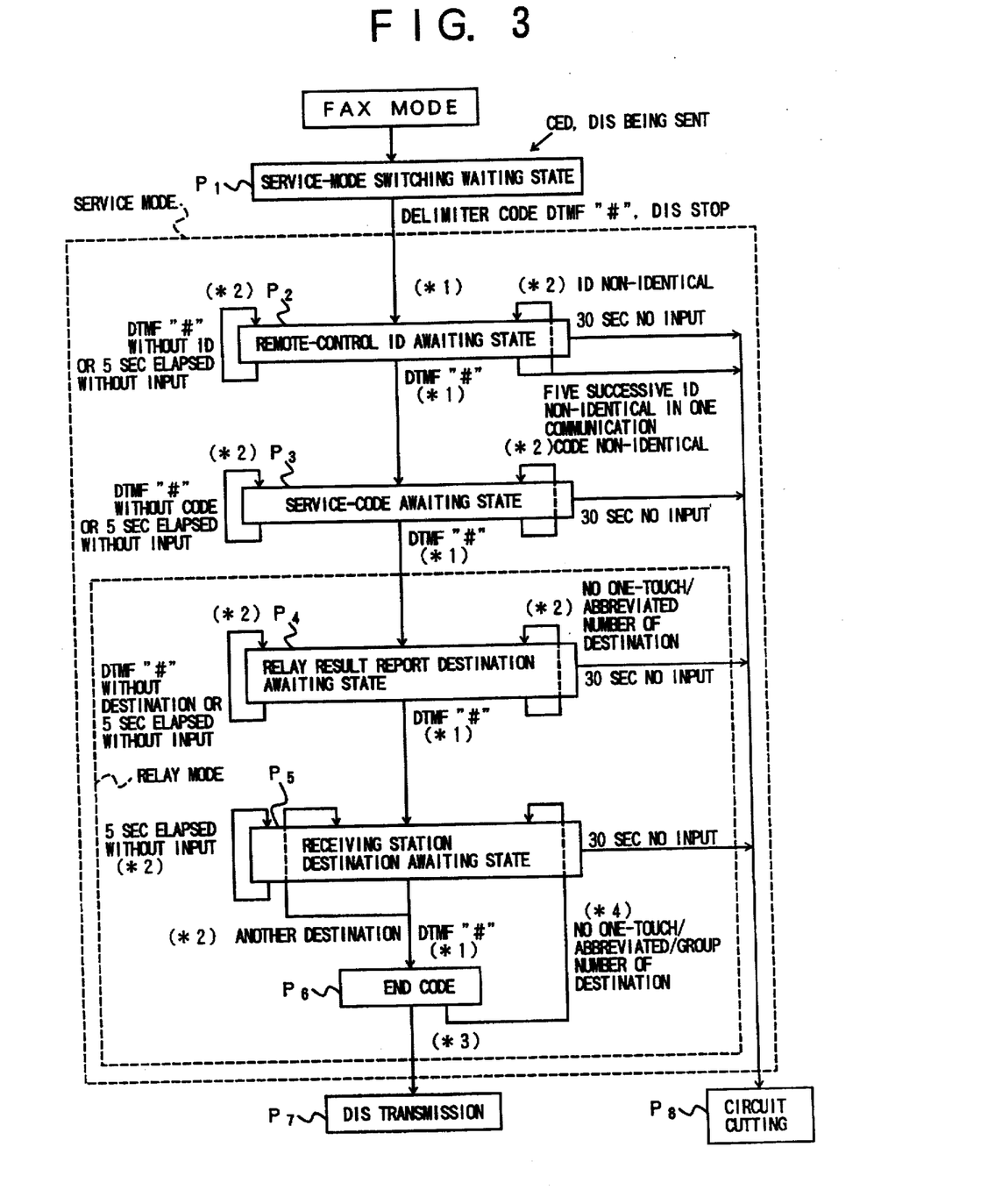
FIG. 3 shows a general operation flow of the above facsimile apparatus.
Figure 4:
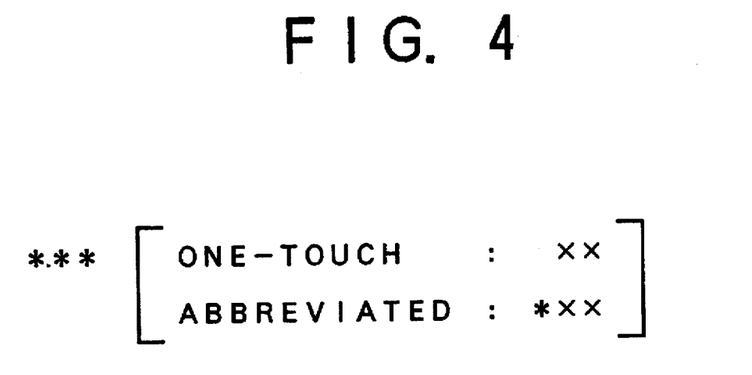
FIG. 4 shows a data example to be used in the above facsimile apparatus in detection of destination number for a relay result report transmission.

The relay station in the above state (the process $P_4$) of awaiting the relay result report destination to be input checks the DTMF data transmitted by the requesting station for a one-touch number or abbreviated number representing the report destination to-which the relay result report is to be sent (which number will be referred to as the report destination). The one-touch number and abbreviated number consist of numerical codes such as shown in FIG. 4. That is, the one-touch number consists of XX and the abbreviated number consists of *XX, where the symbol X is a digit 0–9. If either number is found, the relay station checks whether or not the found number is identical to one previously stored in the relay station. If it is identical, the relay station transmits the acknowledgement tone so as to inform the requesting station that the relay station enters a state (a process $P_5$ in FIG. 3) of awaiting a receiving station destination to be input. If the one-touch number or abbreviated number present in the DTMF data is not identical to one which the relay station has, the relay station transmits the non-acknowledgement tone so as to cause the requesting station to recognize that the relay station again enters the state (the process $P_4$) of awaiting the relay result report destination to be input. If either the relay station detects a solitary DTMF tone "#" including no report destination or a time period equal to 5 seconds has elapsed without receiving suitable input data, the relay station transmits the non-acknowledgement tone so as to cause the requesting station to recognize that the relay station again enters the state of awaiting the relay result report destination to be input (in the process $P_4$). If the relay station in the report destination awaiting state receives no input data for 30 seconds, the relay station cuts the communication circuit (in a process $P_8$ in FIG. 3).

The relay station in the above receiving station destination awaiting state (the process $P_5$) checks whether or not a one-touch number or an abbreviated number or a group number, indicating the receiving station destination, (which number will be referred to as the receiving station destination) is present in the DTMF data transmitted by the requesting station. In this embodiment, the relay station has the capacity to store ten receiving station destinations and the one-touch number consists of DTMF symbols "XX", the abbreviated number consists of DTMF symbols "*XX" and the group number consists of DTMF symbols "**XX", where the symbol X is a digit 0–9.

If the one-touch number, abbreviated number or group number found in the DTMF data is identical to one which the relay station has therein, the relay station transmits the acknowledgement tone and then checks for a number indicating another receiving station destination. Then, if the relay station detects no number indicating another receiving station destination in the DTMF data and then also detects two successive DTMF "#" tones used as an end code (in a process $P_6$ in FIG. 3), the relay station transmits a relay possible tone (three successive cycles each consisting of a 1750 Hz tone of 700 ms duration followed by a 200 ms silence interval, referred to as *3 in FIG. 3), then transmitting the DIS (in a process $P_7$ in FIG. 3). If either the relay station detects a number indicating another receiving station destination or a time period equal to 5 seconds has elapsed without receiving suitable input data, the relay station transmits the non-acknowledgement tone so as to cause the requesting station to recognize that the relay station again enters the receiving station destination awaiting state (the process $P_5$). Then, the relay station cuts the communication circuit (in the process $P_8$) if the station in the receiving station destination awaiting state does not receive any input data for 30 seconds. If the relay station detects a one-touch number, abbreviated number or group number representing a receiving station destination and, has no number identical to the detected number, the relay station transmits a relay-not-possible tone (five successive cycles each consisting of a 1750 Hz tone of 80 ms duration followed by a 580 Hz tone of 80 ms duration and then a 500 ms silence interval, referred to as *4 in FIG. 3) so as to cause the requesting station to recognize that the relay station again enters the receiving station destination awaiting state (the process $P_5$).

Figure 2:
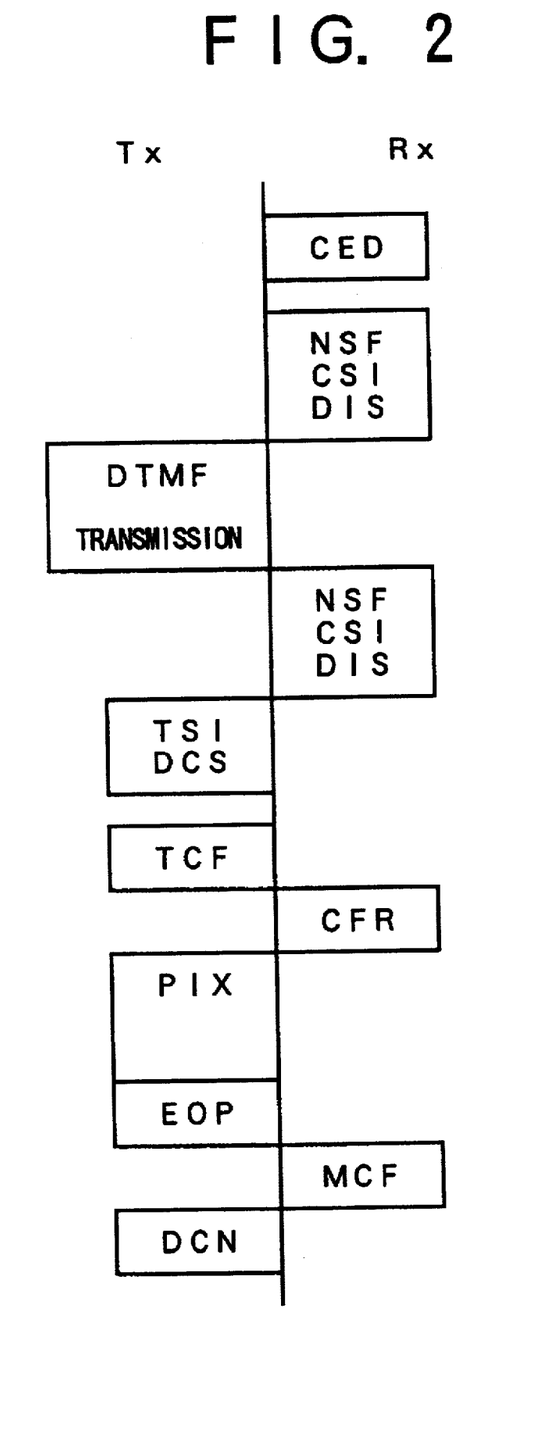
FIG. 2 shows a transmission procedure flow of the above facsimile apparatus.

With reference to FIG. 2, the relay-transmission requesting process flow subsequent to the above process in the above facsimile apparatus is now described. The relay station (Rx), after detecting the relay result report destination and receiving station destination, stores image information transmitted by the requesting station. Then, the relay station transmits the stored image information to the receiving station. Note that in the related art, the relay station cannot accept the NSF if the requesting station (Tx) attempts to specify the receiving station destination using the NSF in the relay transmission requesting method unless the manufacturer of the requesting station is the same as that of the relay station. However, the facsimile apparatus in the first embodiment of the present invention acting as the relay station can accept the receiving station destination through the DTMF tones. The relay station performs the relay transmission of the stored image information using the receiving station destination detected from the DTMF data transmitted by the requesting station after once receiving the image information. The image information is transmitted in the ordinary facsimile transmission operation after the ordinary relay requesting process is performed using the NSF. The relay station may recognize the relevant image information to be handled as information to be relayed by detecting the connection between the relay request and image information, both being handled successively. The relay station in the first embodiment stores the information concerning the relay transmission obtained from the DTMF data and uses it for the subsequent facsimile transmission of the image information.

Thus, the relay station in the first embodiment of the facsimile apparatus according to the present invention using the DTMF data for accepting information of the receiving station destination can accept a relay transmission request even if the request comes from either a facsimile apparatus having no special relay requesting function or an apparatus manufactured by a manufacturer different from the manufacturer of the apparatus which is to accept the request. Thus, relay multi-address transmission may be easily performed either between facsimile apparatuses manufactured by different manufacturers or between facsimile apparatuses manufactured by the same manufacturer.

Further, the apparatus can easily accept the destination station number, through the DTMF tones transmitted by the requesting station, to be used in transmission of a relay result report to the requesting station. Thus, the relay (multi-address transmission) result report may be easily sent to the requesting station.

Figure 5:
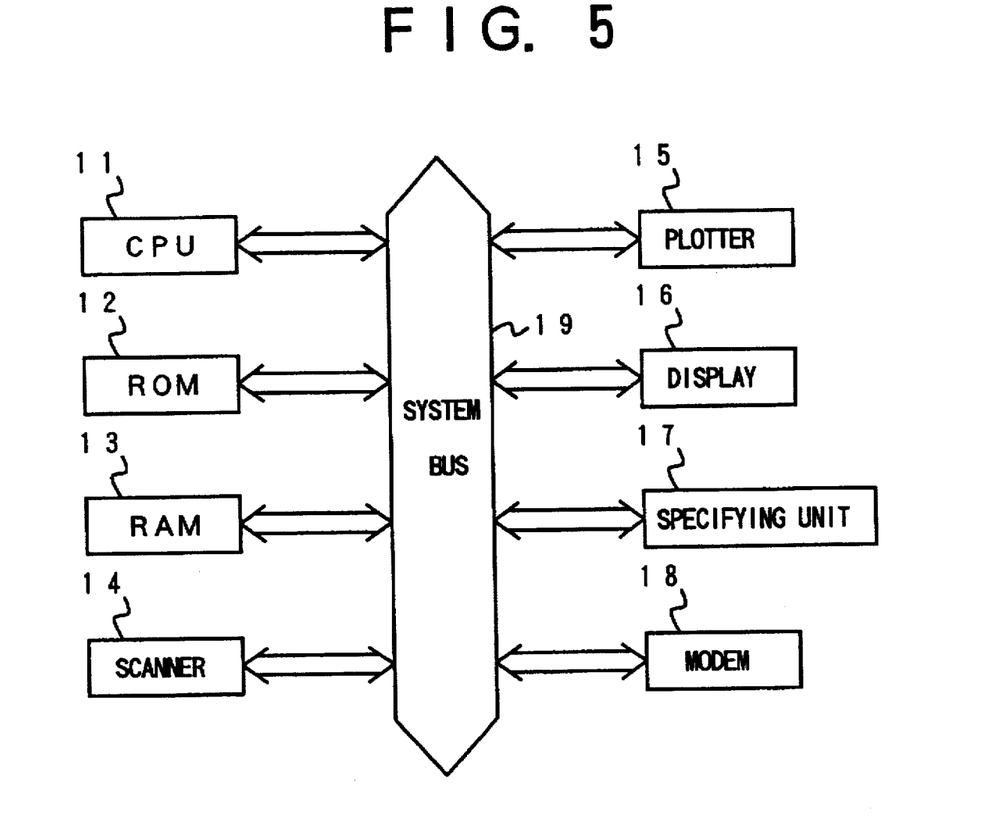
FIG. 5 shows a block diagram of a facsimile apparatus in a second embodiment of the present invention.

With reference to FIG. 5, a system construction of a facsimile apparatus of a second embodiment of the present invention is now described. The apparatus includes a CPU 11 of a microcomputer for controlling communication operations and so forth. The apparatus also includes a ROM 12 for storing various control programs which the CPU 11 performs and various types of data necessary for the CPU 11 to perform the control programs. The apparatus also includes a RAM 13 for storing image information to be transmitted. The apparatus also includes a scanner 14 for reading an original image at a predetermined resolution so as to obtain read information. The apparatus also includes a plotter 15 for printing given image data on a recording sheet at a predetermined resolution. The apparatus also includes a display 16 for displaying a telephone number or the like as appropriate. The apparatus also includes a specifying unit 17 for an operator to specify a telephone number or the like as appropriate. The apparatus also includes a modem 18 for processing data so as to transfer the data between the apparatus and a communication line. The above component each is connected to a system bus 19 and data is transferred among the components generally via the system bus 19.

Operation of the apparatus is now described with reference to FIGS. 6 and 7.

An operator of a requesting station dials a number of a relay station through a telephone handset of the facsimile apparatus. The relay station comprises a facsimile apparatus in the first embodiment of the present invention. Then, after the relay station accepts the calling by the above dialing, the relay station transmits a CED and DIS. During the CED and DIS transmission (in a process $P_{11}$ in FIG. 7), the relay station checks the signal transmitted by the requesting station for a DTMF "#" of a delimiter. If it is found, the relay station stops the DIS transmission. Then, if the relay station meets a relay possible condition, the station transmits an acknowledgement tone (the 1750 Hz tone for 700 ms, referred to as *1 in FIG. 7) so as to cause the requesting station to know that the relay station enters a service mode. If the relay station does not meet the relay possible condition when the DIS transmission is stopped due to the DTMF "#" detection, the station transmits a relay-not-possible tone (five successive cycles each consisting of a 1750 Hz tone of 80 ms duration followed by a 580 Hz tone of 80 ms duration and then a 500 ms silence interval, referred to as *4 in FIG. 7) and then cuts the communication circuit (in a process $P_{18}$). Such a state as that where the relay station does not meet the relay possible condition is a state, for example, where the memory of the station is full so that the station cannot receive data to be stored in the memory or a state where the relay station has no information of its own telephone number therein. The relay station should have such information so that the station can include the information in a relay result report for example. The requesting station which has received the report from the relay station may recognize which station has sent the report, by reading the information of the relay station's telephone number contained in the report as mentioned above. The relay station transmits the DIS for a predetermined time period T1 without performing a "#" detection operation if either a DTMF relay acceptance function switch is OFF or an ID lock state is present.

Figure 7:
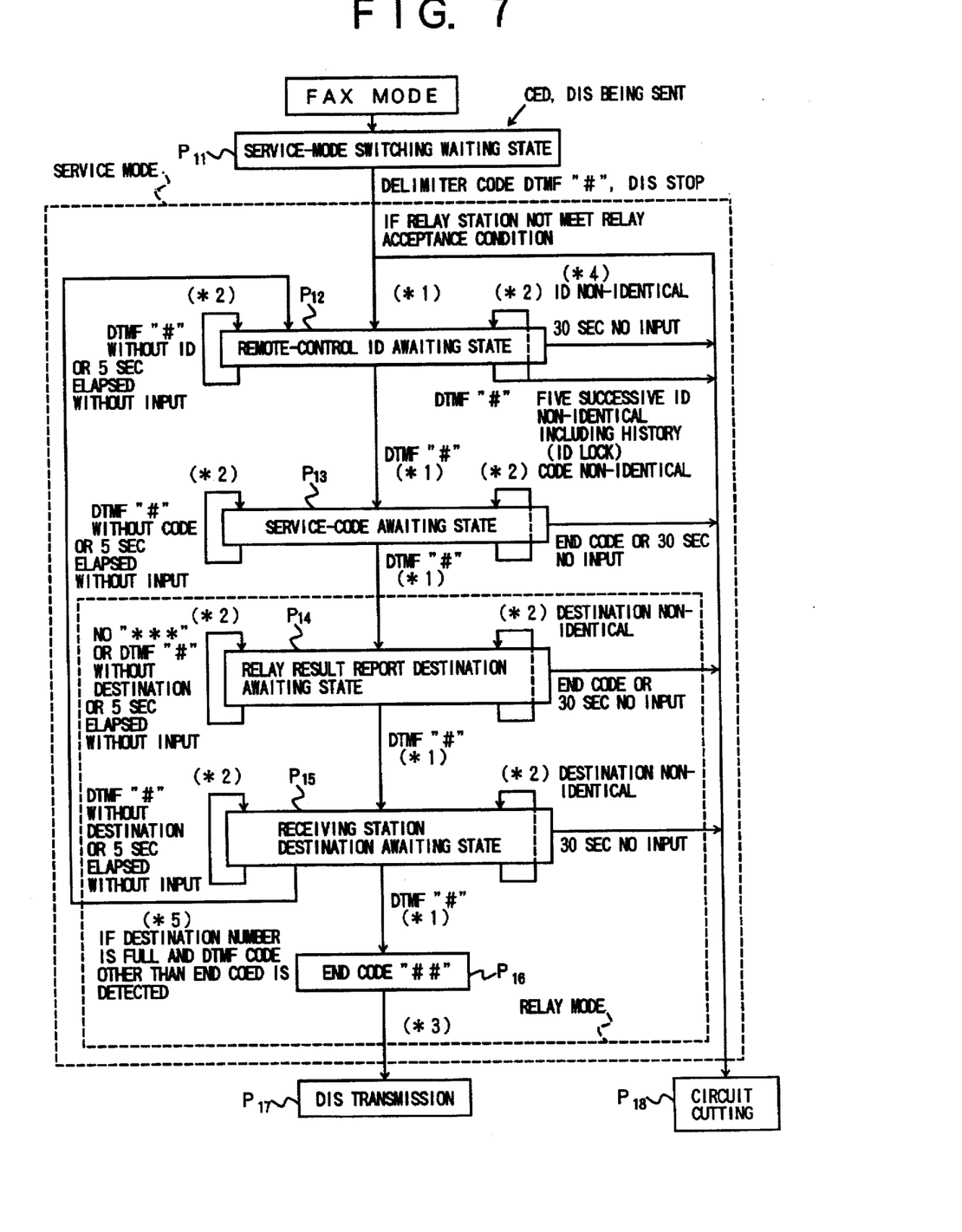
FIG. 7 shows a general operation flow of the above facsimile apparatus.

The relay station in the service mode is in a state of awaiting the remote-control ID (identifier) to be input (in a process $P_{12}$ in FIG. 7). The relay station then checks whether a remote-control ID (comprising four-digit code consisting of digits 0–9) detected in the DTMF data transmitted by the requesting station is identical to one previously stored in the relay station. If it is identical, the relay station transmits the acknowledgement tone so as to cause the requesting station to recognize that the relay station enters a state (a process $P_{13}$ in FIG. 7) of awaiting a service code to be input. If either the relay station does not have the remote-control ID therein identical to that included in the DTMF data transmitted by the requesting station or 5 seconds has elapsed without any input data being received or a solitary DTMF tone "#" accompanied by no remote-control ID is detected, the relay station transmits a non-acknowledgement tone (three successive cycles each consisting of a 580 Hz tone of 80 ms duration followed by a 60 ms silence interval, referred to as *2 in FIG. 7) so as to cause the requesting station to recognize that the relay station again enters the state of awaiting the remote-control ID to be input (in the process $P_{12}$). If the relay station in the remote-control ID awaiting state receives no input data for 30 seconds, the relay station cuts the communication circuit (in a process $P_{18}$ in FIG. 7). If the requesting station successively sends five remote-control IDs and none of them are identical to one which the relay station has therein, the ID lock state is activated and thus the relay station cuts the circuit (in the process $P_{18}$). The above five remote-control IDs include history information and either those received in a remote-control ID receiving operation or those received during a plural times of communication operation performance.

The relay station in the above state of awaiting a service code to be input (in the process $P_{13}$) checks whether a service code detected in the DTMF data transmitted by the requesting station is identical to one previously stored in the relay station. The term 'service code' means a predetermined code which the relay station needs to receive so as to perform the relevant relay transmission function. In this example, the service code is assumed to be "24". If the service code found in the DTMF data is identical to one which the relay station has therein, the relay station transmits the acknowledgement tone so as to cause the requesting station to know that the relay station enters a state (a process $P_{14}$ in FIG. 7) of awaiting a relay result report destination to be input. If either the service code present in the received DTMF data is not identical to one which the relay station has or 5 seconds has elapsed without receiving suitable input data or a solitary DTMF tone "#" accompanied by no service code is detected, the relay station transmits the non-acknowledgement tone so as to cause the requesting station to recognize that the relay station again enters the state (the process $P_{13}$) of awaiting the service code to be input. If two DTMF "#" tones, indicating the end code, are received, the relay station cuts the circuit (in the process $P_{18}$). If the relay station in the service code awaiting state receives no input data for 30 seconds, the relay station cuts the communication circuit (in the process $P_{18}$).

Figure 8:
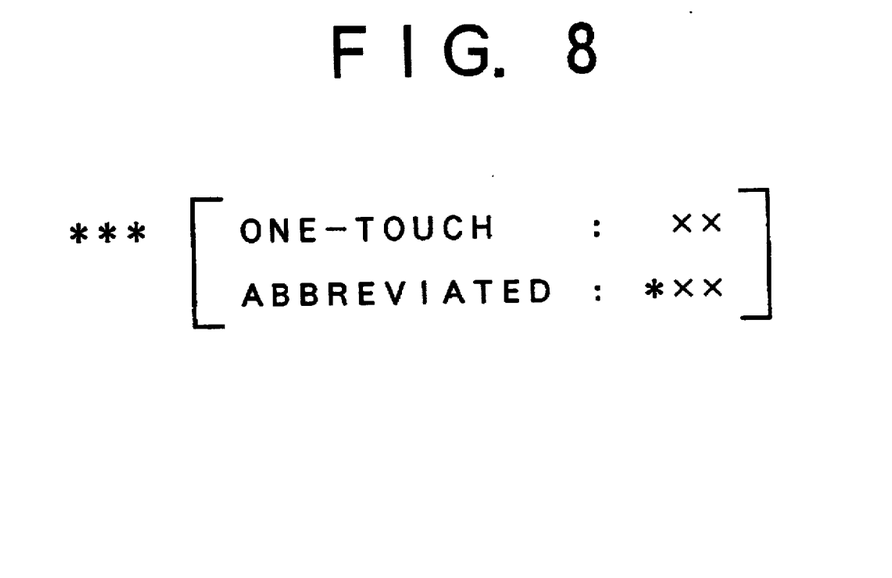
FIG. 8 shows a data example to be used in the above facsimile apparatus in detection of destination number for a relay result report transmission.

The relay station in the above state (the process $P_{14}$) of awaiting the relay result report destination to be input checks the DTMF data transmitted by the requesting station for a one-touch number or an abbreviated number representing the report destination to which the relay result report is to be sent (which number will be referred to the report destination). The one-touch number and abbreviated number consist of numerical codes such as shown in FIG. 8. That is, the one-touch number consists of XX and the abbreviated number consists of *XX, where the symbol X is a digit 0–9. Three successive "*" symbols are to be provided by the requesting station immediately before the provision of the above number XX or *XX so as to ensure that the relay station can identify the report destination, that is, so as to prevent the relay station from problematically recognizing the given number to be the report destination if the requesting station does not transmit the report destination and transmits a receiving station destination even though such transmission manner is not the normal one. If either number is found, the relay station checks whether or not the found number is identical to one previously stored in the relay station. If it is identical, the relay station transmits the acknowledgement tone so as to inform the requesting station that the relay station enters a state (a process $P_{15}$ in FIG. 7) of awaiting a receiving station destination to be input. If either the one-touch number or abbreviated number present in the DTMF data is not identical to one which the relay station has or 5 seconds has elapsed without receiving suitable input data or a solitary DTMF tone "#" is detected preceded by no "***" and accompanied by no report destination, the relay station transmits the non-acknowledgement tone so as to cause the requesting station to recognize that the relay station again enters the state (the process $P_{14}$) of awaiting the relay result report destination to be input. If two DTMF "#" tones, input indicating the end code, are received, the relay station cuts the circuit (in the process $P_{18}$). If the relay station in the report destination awaiting state receives no input data for 30 seconds, the relay station cuts the communication circuit (in the process $P_{18}$).

The relay station in the above receiving station destination awaiting state (the process $P_{15}$) checks whether or not a one-touch number or abbreviated number or group number, representing the receiving station destination, (which number will be referred to as the receiving station destination) is present in the DTMF data transmitted by the requesting station. In this embodiment, the relay station has the capacity to store thirty receiving station destinations and the one-touch number consists of DTMF "XX", the abbreviated number consists of DTMF "*XX" and the group number consists of DTMF "**XX", where the symbol X is a digit 0–9. If the one-touch number, abbreviated number of group number found in the DTMF is identical to one which the relay station has therein, the relay station transmits the acknowledgement tone. Then, if the relay station detects two successive DTMF "#" tones used as an end code (in a process $P_{16}$ in FIG. 7), the relay station transmits the DIS (in the process $P_{17}$) since the end code indicates that the current operation is finished, that is, that the relay request acceptance is completed.

If either the relay station has no receiving station destination identical to that obtained from the DTMF transmitted by the requesting station or 5 seconds has elapsed without receiving suitable input data or a solitary DTMF tone "#" accompanied by no receiving station destination is detected, the relay station transmits the non-acknowledgement tone so as to cause the requesting station to recognize that the relay station again enters the receiving station destination awaiting state (the process $P_{15}$). If the number of the received receiving station destinations reaches the above capacity of the relay station, that is, if a thirty-first destination is given although the capacity is thirty destinations and DTMF data other than the end code is given, the relay station transmits a re-input instruction tone (a tone resulting from joining two of the acknowledgement tones to the relay-not-possible tone, referred to as *5 in FIG. 7) so as to cause the requesting station to recognize that the relay station returns to the remote-control ID awaiting state (the process $P_{12}$). The relay station cuts the circuit if the station in the receiving station destination awaiting state receives no input for 30 seconds (in the process $P_{18}$).

The above relay acceptance function switch has a function such that the ON state of the switch allows acceptance of a relay request such as that mentioned above through the DTMF signals and the OFF state thereof does not allow the acceptance. Further, the above ID lock state activation has the following three functions. (1) the ID lock state is activated if each of five successive received remote-control IDs is not identical to those stored in the relay station, whether five IDs have been received in one communication occasion or in a plurality of communication occasions. (2) However, once counted IDs which are to be counted for the ID lock state activation determination may be canceled if either an ID is transmitted or revised by the requesting station, before the number of the counted IDs has reached five. (3) If once the ID lock state is activated, any relay transmission function using the DTMF is disabled, the fact being displayed on the display 16, and the above DTMF relay acceptance function SW does not enter the OFF state if the ID lock state is activated.

Figure 6:
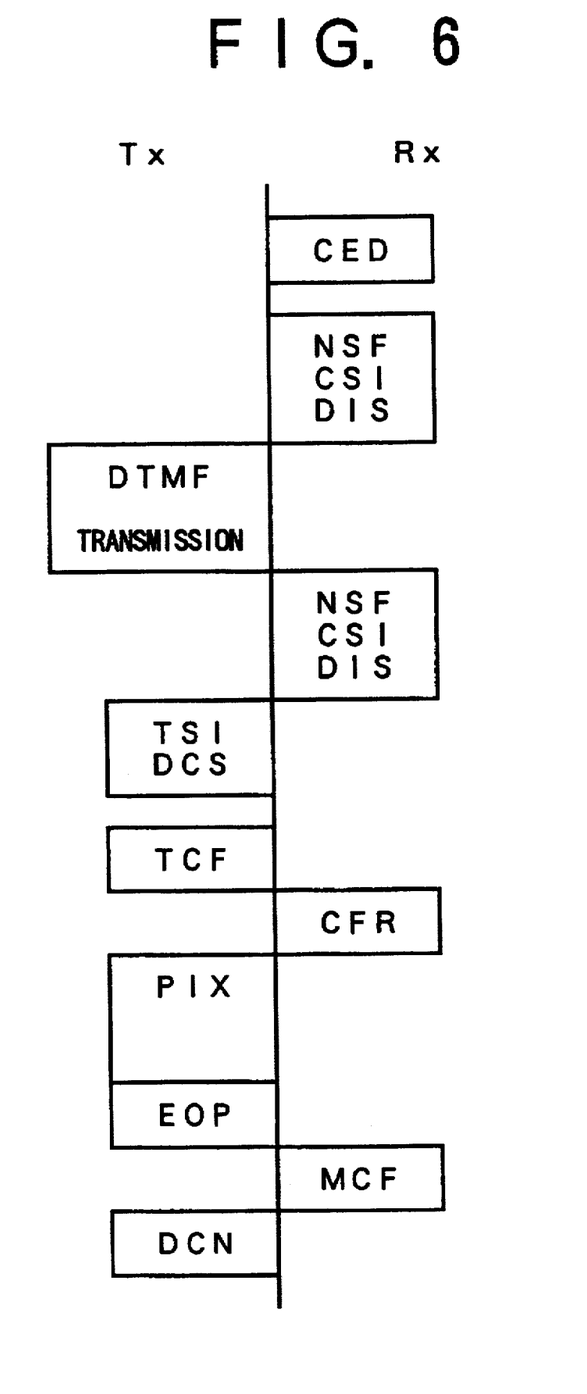
FIG. 6 shows a transmission procedure flow of the above facsimile apparatus.

With reference to FIG. 6, the relay-transmission requesting process flow subsequent to the above process in the above facsimile apparatus is now described. The relay station (Rx), after detecting the relay result report destination and receiving station destination, stores image information transmitted by the requesting station. Then, the relay station transmits the stored image information to the receiving station. Note that in the related art the relay station cannot accept the NSF if the requesting station (Tx) attempts to specify the receiving station destination using the NSF in the relay transmission requesting method unless the manufacturer of the requesting station is the same as that of the first relay station. However, the facsimile apparatus in the first embodiment of the present invention acting as the relay station can accept the receiving station destination through the DTMF tones. The relay station performs the relay transmission of the stored image information using the receiving station destination detected from the DTMF data transmitted by the requesting station after once receiving the image information. The image information is transmitted in the ordinary facsimile transmission operation after the ordinary relay requesting process is performed using the NSF. The relay station may recognize the relevant image information to be handled as information to be relayed by detecting the connection between the relay request and image information, both being handled successively. The relay station in the second embodiment stores the information concerning the relay transmission obtained from the DTMF data and uses it for the subsequent facsimile transmission of the image information.

Thus, the relay station in the second embodiment of the facsimile apparatus according to the present invention using the DTMF data for accepting information of the receiving station destination can accept a relay transmission request even if the request comes from either a facsimile apparatus having no special relay requesting function or an apparatus manufactured by a manufacturer different from the manufacturer of the apparatus which is to accept the request. Thus, relay multi-address transmission may be easily performed either between facsimile apparatuses manufactured by different manufacturers or between facsimile apparatuses manufactured by the same manufacturer.

Further, similar to that in the first embodiment described above, the apparatus in the second embodiment can easily accept the destination station number, through the DTMF signals transmitted by the requesting station, to be used in transmission of a relay result report to the requesting station. Thus, the relay (multi-address transmission) result report may be easily sent to the requesting station.

The relay station apparatus in the second embodiment checks whether or not the receiving station destination numbers are identical to those previously stored in the relay station apparatus number by number. By performing such a checking operation for each receiving station destination number, it is possible to immediately cause the requesting station apparatus to clearly recognize which receiving station destination number is one which is not previously stored in the relay station apparatus.

The reason for the relay stations checking the one-touch number, abbreviated number or group number present in DTMF data sent from the requesting station as described above in the description of the apparatus in the first and second embodiments of the present invention is now described. The relay station has a telephone number of a receiving station (or a requesting station in the case where a relay result report is to be sent) therein and each of the telephone numbers stored therein has the corresponding number such as a one-touch number, abbreviated number or group number which the relay station also has therein. Then, the station obtains the telephone number identified by the relevant number such as the one-touch number, abbreviated number or group number present in the DTMF data if the number present in the DTMF data is identical to one which the relay station has therein. Then, the relay station uses the obtained telephone number of the receiving station (or requesting station) so as to transmit the relevant image information (or relay result report) to the receiving station (or requesting station) via the communication circuit established using the telephone number.

In this connection, the present invention includes another embodiment in which telephone numbers themselves such as those mentioned above of the receiving station (or requesting station) are contained in the DTMF data, instead of numbers such as one-touch numbers, abbreviated numbers or group numbers. Thus, the relay station needs no checking operation such as mentioned above for the station identification and no previous storage of information therein of the station identification for either transmitting the image information to the receiving station or the relay result report to the requesting station. A telephone number itself present in the DTMF data can be directly used to establish the relevant communication circuit via which the relevant information is transmitted.

Further, either apparatus in the first embodiment or second embodiment may have a function to perform the relay multi-address transmission operation in which the destination names of the receiving stations are respectively added to the image information. Such destination names are those previously stored in the relay station so that each destination name may be obtained by specifying a one-touch number, abbreviated number or group number representing a relevant receiving station destination. Such a process simplifies the task of the operator of the relay requesting station regarding adding the destination names to the image information.

Figure 9:
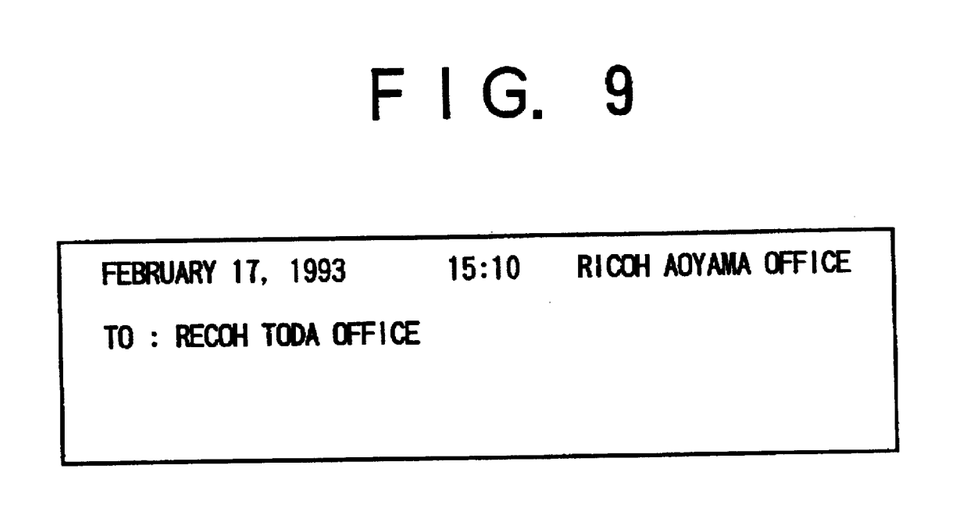
FIG. 9 shows an example of adding of a destination name to an image transmitted in a relay transmission operation.

An example of an image produced by adding a destination name (RICOH TODA OFFICE) of a receiving station to the relevant image information as described above in a relay multi-address transmission is shown in FIG. 9. Such a destination name may be provided on the first page of the image and not provided on the subsequent pages. The 'RICOH AOYAMA OFFICE' is the name of the requesting station.

Further, the present invention is not limited to the above described embodiments, and variations and modifications may be made without departing from the scope of the present invention.

What is claimed is:

1. A facsimile apparatus comprising:
    detecting means for detecting dual-tone multifrequency data; and
    processing means for determining from the dual-tone multifrequency data sent from a requesting station whether a relay transmission is requested and for recognizing from the dual-tone multifrequency data a destination for a receiving station which is to receive image information from the requesting station;
    wherein, when the requesting station requests relay transmission, the requesting station sends the image information to the facsimile apparatus and the facsimile apparatus performs the relay transmission to the receiving station and thus transmits the image information to the receiving station, and wherein said facsimile apparatus checks said dual-tone multifrequency data transmitted by said requesting station for a one-touch number or an abbreviated number representing a destination where a relay report is to be transmitted, wherein said destination may include stations other than said facsimile apparatus and said requesting station.

2. A facsimile apparatus according to claim 1, wherein said processing means receives a destination station number from said requesting station in dual-tone multifrequency data.

3. The facsimile apparatus according to claim 1, further comprising destination name adding means for adding the destination name, which has been obtained using said receiving station number, to said image information; and
    transmission means for transmitting said image information together with said destination name to said receiving station.

4. The facsimile apparatus according to claim 1, further comprising checking means for checking whether receiving station numbers detected by said detecting means and each indicating a receiving station to which said image information is to be transmitted are identical to those previously stored in said facsimile apparatus.

5. A facsimile method for a facsimile apparatus comprising the steps of:
    (a) detecting dual-tone multifrequency data corresponding to a relay request from a requesting station;
    (b) transmitting information to a receiving station; and
    (c) transmitting a relay result report to a destination indicated by said dual-tone multifrequency data in the form of a one touch number or an abbreviated number, wherein said destination may include stations other than said facsimile apparatus and said requesting station.

6. A facsimile method according to claim 5 further comprising the step of:
    (a) detecting dual-tone multifrequency data corresponding to a receiving station number from a requesting station which has requested a relay transmission operation to be performed; and
    (b) a transmission step transmitting a relay result report to the destination station having said receiving station number, the relay result report concerning said relay transmission operation which has been performed in accordance with said relay request.

7. The facsimile method according to claim 5, further comprising:
    (c) a destination name adding step adding the destination name, which has been obtained using said receiving station number, to said information;
    and wherein said transmission step (b) transmits said information together with said destination name to said receiving station.

8. The facsimile method according to claim 5, further comprising a checking step checking whether or not the receiving station numbers are identical to those previously stored in the facsimile apparatus which is used in the relay transmission operation.

9. A facsimile apparatus comprising:
    means for transmitting and receiving signals over a communication line;
    means for receiving a DTMF delimiter signal from the communication line corresponding to a relay transmission request; and
    means for transmitting a relay result report to a destination indicated by said DTMF delimiter data in the form of a one-touch number or an abbreviated number, wherein said destination may include stations other than said facsimile apparatus and said requesting station.

10. The facsimile apparatus according to claim 9, further comprising:
    means for transmitting a first DTMF acknowledgement signal over the communication line for acknowledging that the delimiter signal is received and for signalling that the facsimile apparatus enters a service mode.

11. The facsimile apparatus according to claim 10, further comprising:
    means for receiving a DTMF remote-control ID from the communication line; and means for transmitting a second DTMF acknowledgement signal over the communication line to acknowledge that the remote-control ID is received.

12. The facsimile apparatus according to claim 11, further comprising:

means for receiving a DTMF service code from the communication line; and means for transmitting over the communication line a third DTMF acknowledgement signal acknowledging that the service code is correct.

13. The facsimile apparatus of claim 12, further comprising:

means for receiving a DTMF relay result report destination from the communication line; and means for transmitting a fourth DTMF acknowledgement signal over the communication line for acknowledging that the relay result report destination is correct.

14. The facsimile apparatus of claim 13, further comprising:

means for receiving a DTMF receiving station destination signal over the communication line.

15. The facsimile apparatus of claim 14, further comprising:

means for transmitting facsimile image information to a receiving station identified by the receiving station destination signal.

16. A facsimile apparatus comprising:

a detector detecting dual-tone multifrequency data; and a processor determining from the dual-tone multifrequency data sent from a requesting station whether a relay transmission is requested and for recognizing from the dual-tone multifrequency data a destination for a receiving station which is to receive image information from the requesting station;

wherein, when the requesting station requests relay transmission, the requesting station sends the image information to the facsimile apparatus and the facsimile apparatus performs the relay transmission to the receiving station and thus transmits the image information to the receiving station, and wherein said facsimile apparatus checks said dual-tone multifrequency data transmitted by said requesting station for a one-touch number or an abbreviated number representing a destination where a relay report is to be transmitted, wherein said destination may include stations other than said facsimile apparatus and said requesting station.

17. A facsimile apparatus according to claim 16, wherein said processor receives a destination station number from said requesting station in dual-tone multifrequency data.

18. The facsimile apparatus according to claim 16, further comprising a destination name adding unit adding the destination name, which has been obtained using said receiving station number, to said image information; and a transmitter transmitting said image information together with said destination name to said receiving station.

19. The facsimile apparatus according to claim 16, further comprising a checking unit checking whether receiving station numbers detected by said detector and each indicating a receiving station to which said image information is to be transmitted are identical to those previously stored in said facsimile apparatus.

20. A facsimile apparatus comprising:

a transmitter transmitting and receiving signals over a communication line;

a receiver receiving a DTMF delimiter signal from the communication line corresponding to a relay transmission request; and the transmitter transmitting a relay result report to a destination indicated by said DTMF delimiter data in the form of a one-touch number or an abbreviated number, wherein said destination may include stations other than said facsimile apparatus and said requesting station.

21. The facsimile apparatus according to claim 20, wherein the transmitter transmits a first DTMF acknowledgement signal over the communication line for acknowledging that the delimiter signal is received and for signalling that the facsimile apparatus enters a service mode.

22. The facsimile apparatus according to claim 21, wherein the receiver receives a DTMF remote-control ID from the communication line; and wherein the transmitter transmits a second DTMF acknowledgment signal over the communication line to acknowledge that the remote-control ID is received.

23. The facsimile apparatus according to claim 22, wherein the receiver receives a DTMF service code from the communication line; and wherein the transmitter transmits over the communication line a third DTMF acknowledgment signal acknowledging that the service code is correct.

24. The facsimile apparatus of claim 23, wherein the receiver receives a DTMF relay result report destination from the communication line; and wherein the transmitter transmits a fourth DTMF acknowledgment signal over the communication line for acknowledging that the relay result report destination is correct.

25. The facsimile apparatus of claim 24, wherein the receiver receives a DTMF receiving station destination signal over the communication line.

26. The facsimile apparatus of claim 25, wherein the transmitter transmits facsimile image information to a receiving station identified by the receiving station destination signal.

* * * * *